United States Patent [19]

Gladwin, deceased et al.

[11] 4,246,812
[45] Jan. 27, 1981

[54] METHOD AND APPARATUS FOR BORING A TAPERED, CURVED I.D. TUBULAR CASTING MOLD

[75] Inventors: Floyd R. Gladwin, deceased, late of Grosse Ile, Mich., by Yvonne J. Gladwin, executrix; Joseph Grzincic, Grosse Ile, Mich.

[73] Assignee: Gladwin Corporation, Taylor, Mich.

[21] Appl. No.: 18,131

[22] Filed: Mar. 7, 1979

[51] Int. Cl.³ .................... B23B 3/00; B23B 41/06; B23B 39/08

[52] U.S. Cl. .................... 82/1 C; 82/1.4; 408/3; 409/225

[58] Field of Search .................. 82/1 C, 1.4, 1.5; 408/69, 71, 127, 131, 3; 409/120, 122, 123, 130, 143, 145, 225, 226

[56] References Cited

U.S. PATENT DOCUMENTS

| | | | |
|---|---|---|---|
| 2,672,772 | 3/1954 | Bungay | 409/225 |
| 3,367,217 | 2/1968 | Franks | 82/1.4 |
| 3,464,314 | 9/1969 | Gladwin | 409/145 |
| 3,617,143 | 11/1971 | McKee | 408/127 |
| 3,709,624 | 1/1973 | Blank | 409/226 |
| 3,874,809 | 4/1975 | Hahn et al. | 408/3 |
| 4,023,451 | 5/1977 | Acton et al. | 82/1.5 |
| 4,061,077 | 12/1977 | Gladwin | 409/225 |

Primary Examiner—Harrison L. Hinson
Attorney, Agent, or Firm—Cullen, Sloman, Cantor, Grauer, Scott & Rutherford

[57] ABSTRACT

A tapered and curved internal diameter is formed within a tube used as a continuous casting mold by feeding the tube lengthwise along an arc which is tangent to the axis of the spindle of a boring mill having a rotatable boring head arranged within the tube for cutting the interior wall thereof. The boring head and spindle revolve about a fixed axis, but the boring tool or cutter carried by the head is gradually moved transversely of the spindle axis while the tube is advanced along the arcuate path. Thus, the opening within the tube is tapered from one end to the other, and is also curved, wherein the tube is useful as a continuous casting mold and the like.

8 Claims, 8 Drawing Figures

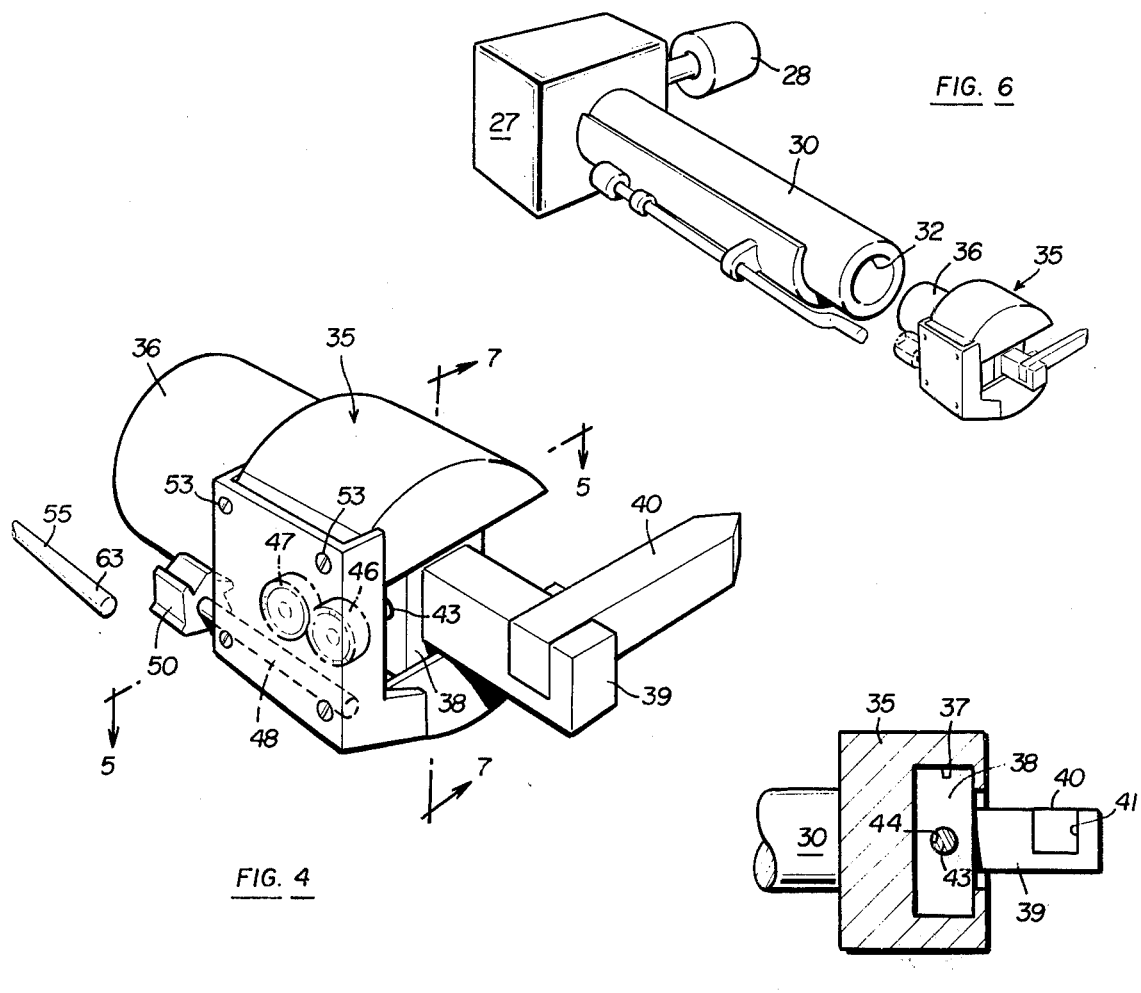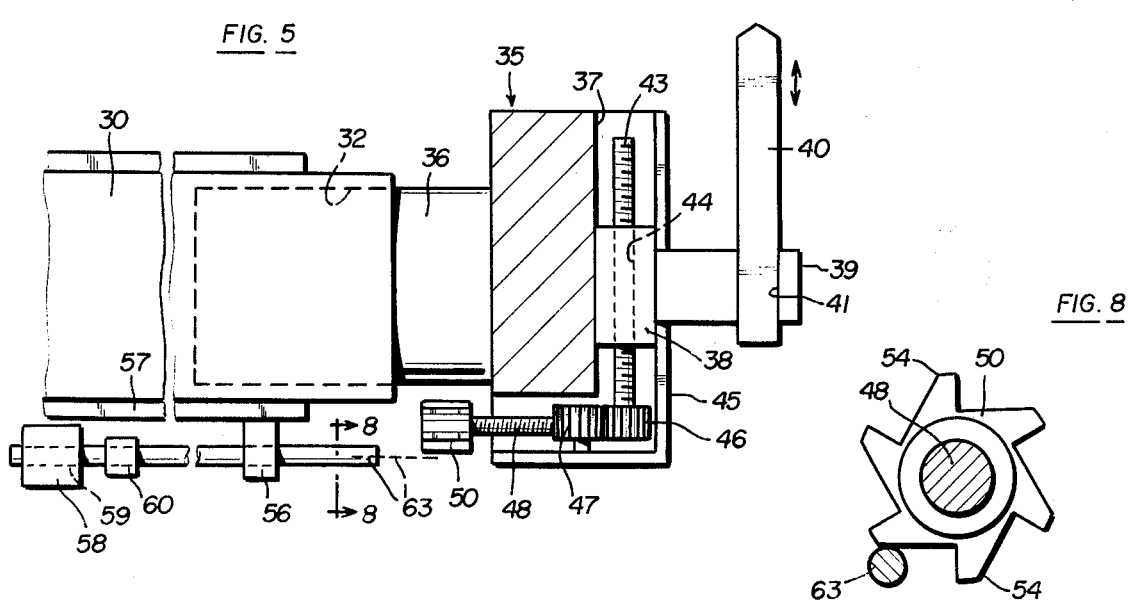

4,246,812

METHOD AND APPARATUS FOR BORING A TAPERED, CURVED I.D. TUBULAR CASTING MOLD

BACKGROUND OF INVENTION

In certain continuous casting processes for continuously casting metal, the mold used is tubular in shape to produce a circular cross-section continuous slab. By way of example, the continuously cast slab may be on the order of 9 inches in diameter and of continuous length as an endless ribbon formed by pouring molten metal downwardly into a tube and then withdrawing the solidifying metal through the bottom of the tube. The solidified metal ribbon is ultimately cut to predetermined lengths.

In such continuous casting operations, it is desirable to taper the interior opening within the tubular mold to compensate for the shrinkage of the metal as it solidifies within the mold. In addition, it is desirable to be able to gradually curve the metal ribbon from its vertically downwardly pointed direction towards the horizontal. By gradually curving the ribbon as it forms within the mold, the curving may be continued through guide rollers and ultimately the ribbon will move in a horizontal direction so that it can be more easily handled when it is cut to length.

The invention herein is concerned with the boring of a curved and tapered wall within a pre-formed tube of substantial diameter and length, utilizing conventionally available boring mill equipment, such as a horizontal boring mill which may be temporarily modified or equipped for the purpose of carrying out the invention herein.

The equipment contemplated for use for the purposes of this invention is of the type described in the Gladwin U.S. Pat. Nos. 3,464,314, issued Sept. 2, 1969; 3,910,159 issued Oct. 7, 1975, and 4,061,077 issued Dec. 6, 1977, which discloses a milling machine useful for forming large radius curves on plates, particularly of the type of plates useful in forming the walls of continuous casting molds. Such equipment generally includes a work piece support table which is reciprocably mounted upon a support bed for horizontal movement relative to a cutter. The table rests upon curved support rails which engage correspondingly curved flanges on the bottom of the table so that the table moves in a horizontal plane but along an arc having a vertical axis. The arc is of substantial radius, such as a number of feet. That type of work piece moving mechanism applied upon a boring mill having a horizontally axised boring spindle is contemplated as the basic equipment which may be used for the purposes of the invention herein.

In essence, the invention comtemplates utilizing known or existing boring mill or milling machine equipment with some modification and in a unique manner to produce a curved and tapered large interior diameter bore within a tube or the like in a practical and relatively inexpensive manner which, seems not to have been possible before this invention.

SUMMARY OF INVENTION

This invention contemplates boring or cutting the interior wall of a tube of relatively large diameter and of considerable length, utilizing a fixed axis rotating spindle type of boring machine having a boring head mounted thereon and fitted within the tube so that its cutting tool engages against the tube interior wall. Meanwhile, as the tool rotates and cuts the interior of the tube wall, the tube itself is fed longitudinally along a predetermined arc so that the wall is formed with a curved axis. In addition, the invention contemplates moving the cutting tool relative to its boring head in a direction transverse to the axis of rotation of the boring head and boring spindle so that the diameter of the cut may be varied to produce a tapered interior diameter as well as curved.

The invention contemplates mounting the cutting tool upon a slider fitted upon the boring head and movable by rotation of a screw. The screw in turn is connected through gears to a cam wheel which is mounted upon the boring head so that it rotates with the boring head, but in addition independently rotates to turn the gears and operate the cutting tool slide means. A control rod is arranged alongside of the boring spindle and is endwise movable into the path of the cam wheel so that periodically, as the cam wheel rotates with the boring head, it contacts the rod for rotation about its own axis. The rod itself may be advanced into interference with or out of the path of the cam wheel by means of a separate solenoid mechanism which may be operated either on a time basis or on a rotation counting basis for periodically moving the rod into the path of the wheel and thereby operating the mechanism for moving the cutting tool transversely of the axis of the boring head.

By appropriately timing the movement of the rod so that it periodically impacts and causes the cam wheel to rotate and thereby adjust the position of the cutting tool, the boring or cutting action of the tool on the inside wall of the tube may be controlled to form the desired taper or multiple taper contour.

An object of the invention herein is to provide a simplified method and apparatus for forming tapered and curved interior walls on relatively large diameter tubes, particularly useful for continuous casting of metals, which method and equipment can be utilized in conjunction with available milling or boring machinery.

Another object of this invention is to provide a boring head having an adjustable cutting tool with a simple control mechanism that is mechanically operated at predetermined intervals, and which may be substituted for the conventional boring head found on a boring mill, without otherwise having to modify the mill, whereby the mill may be used for boring variable diameter holes.

These and other objects and advantages of this invention will become apparent upon reading the following description, of which the attached drawings form a part.

DESCRIPTION OF DRAWINGS

FIG. 4 is an enlarged, perspective view, of the boring head.

FIG. 5 is an enlarged, fragmentary, partially cross-sectioned view showing the boring head and a portion of the spindle and operating rod taken in the direction of arrows 5—5 of FIG. 4.

FIG. 6 is a perspective view of the boring head and boring spindle, with the two parts separated.

FIG. 7 is a cross-sectional view taken in the direction of arrows 7—7 of FIG. 4, showing the interior of the boring head.

FIG. 8 is a view of the cam wheel contacting the control rod and is taken in the direction of arrows 8—8 of FIG. 5, but to an enlarged scale.

DETAILED DESCRIPTION

Figure 2:
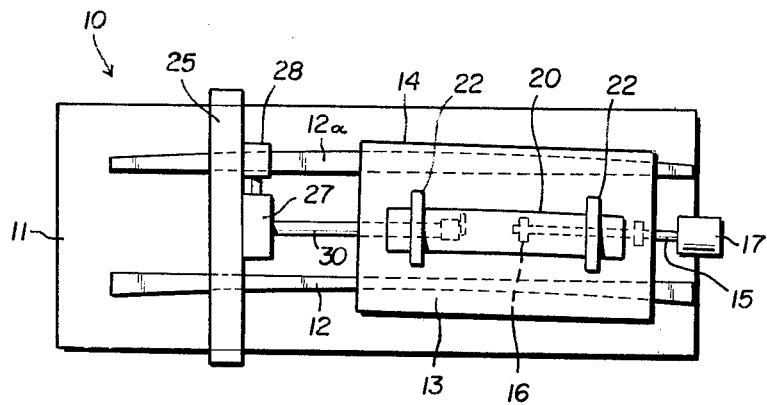
FIG. 2 is a plan view of the machine of FIG. 1.
Figure 1:
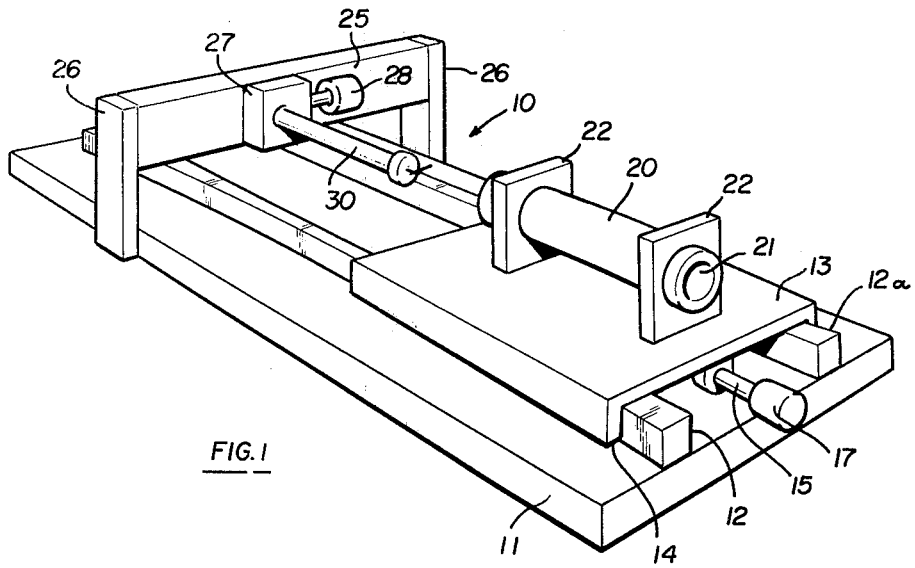
FIG. 1 is a schematic view, shown in perspective, of a boring machine.
Figure 3:
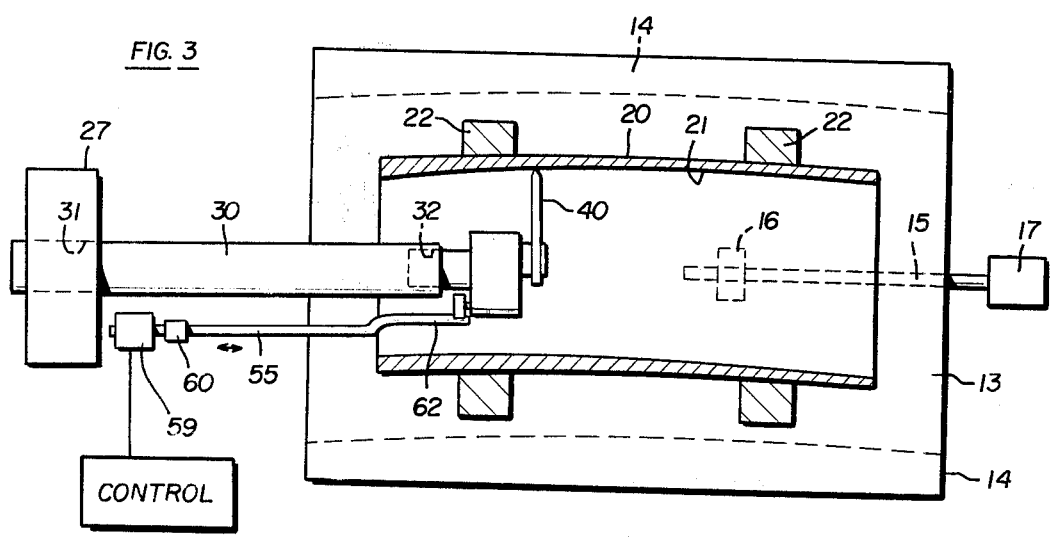
FIG. 3 is an enlarged view showing the tubular work piece in cross-section, mounted upon the machine support table and with the boring head and spindle arranged within the work piece.

FIGS. 1 and 2 schematically illustrate a horizontal milling or boring machine generally designated 10 which is generally similar in construction and operation to the milling machine illustrated in the above mentioned Gladwin, U.S. Patents, for a machine for milling large radius curves on plates. Since the construction and details of this machine is known, and is not claimed to be the invention of this application, the machine itself is illustrated schematically with many of the parts omitted to simplify the illustration and description of this application. Instead, the relevant portions of the known boring or milling machine are illustrated and described in the following description.

The machine includes a bed 11 upon whose upper surface are fastened a pair of curved rails 12 and 12a. A sliding or reciprocating table 13 rests upon the rails. Curved flanges 14 which are secured to the side edges of the table engage the rails or tracks so that the table is movable in a horizontal plane but along a curve of substantial radius, which curve is on a vertical axis.

The table is reciprocated along its curved path by a drive mechanism which broadly includes a drive screw 15 having one end engaged with a threaded bushing or connector 16 which is swivelly connected to the underside of the table so as to move the table in response to rotation of the screw. The opposite end of the screw is connected to a reversible motor 17. Actually, the motor would typically be connected through a suitable gear box for controlling the speed of the screw and the connection between the screw and the table may be formed as disclosed in the above mentioned Gladwin Patent. For purposes of this application, the details of the screw and its drive system and connection to the table are omitted with the understanding that conventional construction may be used, such as the known construction of the above mentioned Gladwin Patent. The result of this equipment is that the table is movable along a curved path.

Secured to the upper surface of the table is a tubular work piece 20. The tube is pre-formed and its interior wall surface 21 is the subject of the machining or boring operation described in this application. The tube length and diameter may vary considerably. By way of example, a tubular continuous casting mold for continuously casting molten steel downwardly through the tube, might be on the order of a 9 inch interior diameter with an overall tube length of about 32 inches. In such a tube, it may be desired to form the interior wall with a taper from the top to bottom direction when the tube is held vertically, of about 10 thousandths of an inch, for example, with the smaller diameter being at the bottom to compensate for shrinkage of metal poured into and cooling within the tube. The interior wall may be desirably formed along a curved arc having a radius of four or many more feet.

The tubular work piece 20, before the machining operation, is secured to the table 13 by means of suitable, conventional clamps 22 which are illustrated schematically for holding the tube rigidly in place.

The boring or milling machine typically includes a cross frame 25 supported by one or more leg supports 26 and is provided with a spindle support 27 and an electrical drive motor 28 for rotating the boring spindle. The usual gear boxes and connections between the motor and the spindle drive are omitted from the application since these form no part of the invention herein and are conventional on available machines of this type.

A conventional, elongated boring spindle 30 is mounted through a bearing 31 formed in the spindle support 27 for a predetermined, constant speed rotation due to the motor and such appropriate gearing as might be found on the equipment.

The free end of the boring spindle is provided with a socket 32. Mounted upon the free end is a boring head 35 having a tapered head support spindle 36 which fits into the spindle socket 32 for connecting the boring head to the boring spindle so that the head and spindle may be rotated together.

The boring head is provided with a cross slot 37 within which a slider block 38 is fitted for transverse movement relative to the axis of the boring spindle. A tool mounting extension 39 is secured to the slider block and extends in the same direction as the axis of the spindle. The tool mounting extension carries a typical cutting tool 40, such as a conventional single point cutting tool having an appropriate cutting point, with the body of the tool fitted within a fastening slot 41 for mounting the tool upon the extension. A screw 43 extends through a threaded opening 44 in the slider block so that rotation of the screw 43 causes the slider block to move transversely of the axis of the boring spindle and head. To this point, the boring head described above is of conventional construction and design and is available commercially.

The invention herein contemplates adding to the boring head a mechanism for automatically moving the slider block and consequently, the cutting tool, automatically on a predetermined basis. For this purpose, a gear box 45 is fastened to the boring head 35. Within the gear box is arranged a gear 46 secured to the end of the screw 43 and engaged with one or more additional gears 47 for appropriate speed reduction and control purposes.

The gear 47 engages and is driven by a threaded screw 48 which extends rearwardly of the gear box and carries a toothed cam wheel 50, which is similar to a gear in appearance. The gear box itself is fitted into a cut-away slot or recess 52 formed on the boring head and is secured in place by appropriate screws 53. Thus, the gear box rotates with the boring head around the axis of the boring spindle 36. During such rotation, the cam wheel rotates around the boring spindle. The cam wheel 50 is provided with a number of radially outwardly extending spokes or fins 54, as illustrated in FIG. 8.

The cam wheel is so formed that rotation of the cam wheel 50 about its own axis, that is about the axis of the threaded screw 48 to which it is connected, rotates the threaded screw. This turns the gears 47 and 46 to rotate the slider block screw 43, which moves the slider block 38 transversely of the axis of the boring head. Such movement adjusts the location of the tip of the cutting tool 40 relative to the axis of rotation of the boring head.

In order to rotate the cam wheel 50, a predetermined, momentary interference member is provided. This member is in the form of an elongated rod 55 arranged alongside of the boring spindle 30. The rod is non-rotatably mounted relative to the boring spindle, by means of supporting it through bearing brackets 56 which in turn are carried by a support sleeve 57. The sleeve may be in the form of a half tube located along the bottom half of the boring spindle.

At the spindle support 27, a solenoid 58 is mounted so that its solenoid armature rod 59 extends in the direction of the rod 55 to which it may be coupled by suitable mechanical coupling 60. Hence, endwise movement of the solenoid armature rod by actuation of the solenoid moves the elongated rod endwise.

The operation of the solenoid may be controlled by any conventional electrical control which may be in the form of a timer to actuate the solenoid at predetermined times or alternatively, may be in the form of a counter which counts the number of rotations of the spindle and at every predetermined number of rotations, actuates the solenoid. Such timing or counting devices are readily available commercially and may be purchased in various sizes or capacities, as needed. Thus, the description of the control is omitted as the control itself forms no part of the invention herein, and various conventional controls may be used interchangeably, depending upon availability.

When the control, either because of the passage of time, such as a certain number of seconds or parts of a second, or because of a number of rotations of the spindle, actuates the solenoid, the solenoid armature extends toward the work piece and thereby moves the elongated rod 55 endwise so that its outer end portion 63 extends into the path of rotation of the cam wheel 50. That is, the rod moves into the path of movement of the cam as the cam travels around the axis of the spindle during the rotation of the spindle and boring head. When the cam wheel reaches the rod end portion 63, one of its spokes or fins 54 impacts against the rod, which causes the cam wheel to turn a short distance. Such movement of the cam wheel, as mentioned above, rotates the screw 48, the gears 47 and 46 and then the screw 43 to move the slider block 38 and the tool 40 transversely of the spindle axis. By regular, although intermittent or timed, movements of the slider block, the cutting end of the tool is moved into a predetermined radius of rotation. Hence, the tool will cut either a larger or smaller diameter path on the work piece, depending on the direction of movement of the tool. Consequently, the transverse movement of the tool permits the forming of a tapered wall, when measured in the direction of one end of the tube to the other. By properly timing the movement of the tool, multiple tapers or undercuts can be formed, although for continuous mold purposes, only a single, relatively smoothly flowing taper is desired.

In operation, a known or standard or conventional milling machine or boring machine may be used, such as the type disclosed in the above mentioned Gladwin Patents. Where that type of equipment is used, if the rails and mechanism for moving the table along a curved path is already mounted on the machine, then all that is required to modify the machine into the use of this application is to exchange the boring head found on the machine for the boring head of the type described here, along with the necessary control rod, solenoid and timing or counting actuating mechanism. Thereafter, a tube which has been pre-formed and is of the appropriate length and approximately the pre-desired interior diameter, is mounted upon the table and the machining operation is performed. Upon completion of one or more tubes, that is, upon carrying out of the boring operations described above, the boring head may be removed and the conventional head replaced so that the machine is now returned to its routine uses. Thus, an available machine may be used from time to time for the purposes of making the curved and tapered bored interior tube walls. The amount of down time for conversion of the machine for this purpose is relatively small and a substantial investment in a single purpose piece of equipment is thereby avoided.

With the apparatus and method described above, fairly accurate dimensions can be machined into the interior walls of the tube. For example, accuracies in the order of a thousandths or several thousandths is easily attained. There seems to be no other practical way for achieving such accuracies in producing the curved axis tubular formation either with or without the tapers, which are possible through the method and equipment described above.

We claim:

1. A method for machining an accurately dimensioned curved interior wall within an elongated tube-like member, comprising:
   positioning within the tube a rotatable cutting tool which has a fixed position axis of rotation and is movably adjustable radially of such axis, with such axis being aligned with the tube axis;
   moving the tube axially longitudinally relative to the cutting tool along a large radius curve which is substantially tangent to the tube axis and the cutting tool axis of rotation at their intersection with the radius upon which the cutting edge of the cutting tool is located to thereby form a curved interior wall within the tube, and including regularly moving the cutting tool while it is rotating, in a radial direction to thereby taper at least a portion of the interior wall.

2. A method for machining an accurately dimensioned curved interior wall within an elongated tube-like member, comprising:
   positioning within the tube a rotatable cutting tool which has a fixed position axis of rotation and is movably adjustable radially of such axis, with such axis being aligned with the tube axis;
   moving the tube axially longitudinally relative to the cutting tool along a large radius curve which is substantially tangent to the tube axis and the cutting tool axis of rotation at their intersection with the radius upon which the cutting edge of the cutting tool is located to thereby form a curved interior wall within the tube, and including periodically, i.e., regularly and intermittently, moving the cutting tool, while it is rotating, radially to thereby taper the curved interior wall of the tube.

3. A boring machine cutting tool adjustment control for a boring machine having a rotatable spindle with a tool head mounted upon one end of the spindle for rotation therewith, and a tool mounting member supported upon the tool head for rotation with said head around the spindle axis but also for independent radial movement relative to the spindle axis, and a cutting tool rigidly mounted upon said tool mounting member so that radial movement of said member adjusts the depth of cut of the tool relative to the spindle axis, and including a screw means for adjusting the radial position of said tool mounting member, the improvement comprising:

a rotatable gear-like wheel having radially outwardly extending tooth-like portions formed thereon, said wheel being mechanically connected to said screw so that rotation of said wheel rotates the screw to cause radially directed movement of said tool mounting member relative to the tool head;

said wheel being mounted upon an axle which is carried by the head, so that the axle and the wheel rotate with the head, but with said axle being arranged parallel to the spindle axis, so that the wheel may be independently rotated about its own axis, which axis is parallel to, but radially offset relative to, the spindle axis;

an elongated control rod arranged alongside the spindle, and means mounting the control rod for reciprocal, endwise movement;

said rod having an end portion arranged to move, upon endwise movement of the rod in one direction, into a position wherein it interferes with the wheel, that is, it is in the path of and thereby is engaged by the wheel teeth as the wheel rotates with the spindle, so as to cause the wheel to rotate about its own axis to thereby activate the screw means to move the tool mounting member and thus, the tool, in a radial direction for adjusting the radius of the bore being cut.

4. A construction as defined in claim 3 above, and including means for reciprocating the rod at predetermined intervals relating to a predetermined number of rotations of the spindle for thereby gradually changing the radius of cutting of the tool.

5. A construction as defined in claim 3, and said boring machine including a support table upon which a work piece is secured for boring an opening formed in the work piece, and means for moving said table along an arc which is tangent to the spindle axis;

whereby the table is moved during the boring operation so that the cutting tool advances along the length of the opening within the work piece to cut the opening in a lengthwise curved configuration.

6. A boring machine for forming a curved interior wall within a tube-like work piece, comprising:

a power driven rotating spindle having a cutting tool mounted upon one end thereof and having a cutting edge extending radially of the spindle for engaging and cutting against the wall of the work piece opening;

a movable work piece support table supported upon a curved rail means for movement along an arc which is substantially tangent to the axis of the spindle;

means for rigidly securing the work piece upon the table with the work piece having an opening which is oriented to receive the spindle and its cutting tool, so that the tool cuts the interior wall of the opening as the support table moves along its arc to thereby produce a circular in cross-section interior wall which is curved along its longitudinal axis;

and including means for moving the cutting tool radially of the spindle axis at predetermined times to thereby change the radius of the opening along its length;

said means for moving the cutting tool comprising a tool holder mounted upon the spindle end upon which the tool is secured, with the tool holder being movable in a direction radial of the spindle axis in response to rotation of a control wheel;

said wheel being rotatably mounted upon a portion of the tool holder for rotation with the spindle and tool holder as well as for independent rotation around its own axis for controlling radial movement of the tool holder;

and an actuating rod arranged adjacent the spindle and tool holder and being movable into and out of the rotational path of the wheel, i.e., its path of rotation around the spindle axis, for contacting portions of the wheel and thus causing the wheel to rotate in response to such contact;

and means for moving the actuation rod, at predetermined times, e.g., at a predetermined number of spindle rotations, into the rotational path of the wheel, to thereby adjust the radial distance of the cutting tool edge relative to the spindle axis.

7. An adjustable depth cut boring machine head for mounting upon the rotatable spindle of a boring machine, comprising:

a head body for axial alignment with and securement upon the end of the boring machine spindle for rotation therewith, and including a transversely movable slide member;

means for mounting a cutting tool upon said slide member for movement with the slide member radially of the axis of the head;

means for moving the slide member comprising a cam means mounted upon the head and extending radially outwardly of the head and arranged for rotation with the head and spindle as well as independent rotation about its own axis;

said cam means being connected by actuating means to said slide member for causing radial movement of the slide member in response to the cam means rotating about its own axis;

an interference member movable, at predetermined times, into the path of rotation of the cam member as the cam member rotates about the spindle axis with the head, for engaging said cam member and causing it to momentarily rotate about its own axis to thereby actuate and cause the slide member to move radially of the head for thereby adjusting the position of the cutting tool for varying the depth of cut of the bore.

8. A construction as defined in claim 7 above, and said interference member being in the form of an elongated rod mounted alongside of the boring spindle and movable endwise relative to the boring spindle so that its free end may be selectively moved into the path of rotation of the cam member for engaging the cam member during its rotation with the head;

and means for moving said rod at predetermined times into and out of the path of said cam member for thereby controlling the radial movement of the cutting tool.

* * * * *